United States Patent Office 3,016,312
Patented Jan. 9, 1962

3,016,312
WAX COATED CELLOPHANE
John D. Tench, Prospect Park, Pa., and Seymour W. Ferris, Mount Holly, N.J., assignors to Sun Oil Company, Philadelphia, Pa., a corporation of New Jersey
No Drawing. Filed July 2, 1958, Ser. No. 746,087
2 Claims. (Cl. 117—119.2)

This invention relates to a process for coating cellophane and to the coated articles so-produced.

Cellophane, which is essentially regenerated cellulose combined with a softening agent such as glycerol, is well known. Plain cellophane, although substantially impermeable to the common gases, is relatively permeable to water vapor. This permeability to water vapor is sufficient to prevent the use of plain cellophane for wrapping products where the substantial exclusion of moisture is desired. Cellophane can be moisture-proofed at least to an extent by coating with a mixture of components which is usually a closely controlled mixture of cellulose nitrate, gum dammar, paraffin, a plasticizer, and a solvent for such ingredients. Laminates of cellophane and plastics, particularly polyethylene, are also used. Such moisture-proofed cellophane, however, is not entirely satisfactory in that the coated article is still quite permeable to water vapor, the components of moisture proofing baths are expensive and the quantities used must be closely regulated in order to obtain a satisfactory product, and laminating cellophane with polymer sheets is unsatisfactory and expensive. Waxes heretofore used for coating paper have not been employed for coating cellophane since, when applied by prior coating methods, they do not adhere to the cellophane, and/or give a streaked and grainy appearance.

An object of the present invention is to provide a wax coated cellophane having good water vapor permeability, i.e., having high resistance to the passage of water vapor, and which presents a smooth, uniform appearance. Another object is to provide a simple and economical process for coating cellophane with wax. Other objects will be apparent hereinafter.

It has now been found that by applying, in molten phase, a relatively high melting microcrystalline petroleum hydrocarbon wax to cellophane, and relatively slowly cooling the coated article as hereinafter described, a wax-coated cellophane having a smooth, uniform appearance and good water vapor permeability is obtained.

In accordance with the invention, a relatively high melting microcrystalline petroleum hydrocarbon wax is applied in molten phase to cellophane sheet material to form plied in molten phase to cellophane sheet material to form a superficial film thereon. The weight load of wax applied is regulated to a desired value. The coated article is then slowly cooled until the wax solidifies. As has been found, the resulting article presents a smooth, uniform appearance, is flexible, there is no tendency for the wax to slough or peel off, and good water vapor permeability is obtained.

Microcrystalline waxes suitable for use in the present invention have a melting point of from about 170° F. to 200° F. and preferably from 188° F. to 198° F. (ASTM D127–49), a penetration (at 110° F.) of 100 maximum (ASTM D446–53), and a viscosity (at 210° F.) of from 60 to 90 SUS (Saybolt Universal seconds). This wax is advantageously prepared from slack wax derived from the dewaxing of lubricating oil. The slack wax is subjected to vacuum distillation and the material boiling above about 490° F., and preferably above 525° F., at 2 mm. of mercury pressure is separated as a residual fraction. The residual fraction is dissolved in a solvent, such as a mixture of equal parts by volume of methyl ethyl ketone and benzene, at an elevated temperature. The wax solution is then cooled to a temperature of from about 85° F. to 115° F. and the wax precipitated at this temperature separated as by filtering. The separated wax is advantageously washed with an additional quantity of the solvent used preferably at the temperature of precipitation, and the wax recovered from the solvent. The resulting wax is the microcrystalline wax used in preparing the present composition.

The cellophane can be coated with the microcrystalline wax of the invention by any convenient means which applies a uniform coating as by dipping, transfer rolls or the like. The wax load, which is measured as pounds of wax per ream of cellophane, is regulated by means heretofore known, as by passing cellophane coated with molten wax through rollers. After applying molten wax to the cellophane, which must be performed at a temperature of at least 180° F., and preferably is applied at least 10° F. above the melting point of the wax, the molten wax is relatively slowly cooled. Cooling means such as water baths, refrigerated chambers, streams of cold air, and the like, which are generally used to solidify molten wax films extended on paper rapidly solidify the wax and reduce the temperature of the coated article to about room temperature in a very short time, but completely defeat the objects of the invention in that the resulting wax coating rapidly sloughs off the cellophane. Cooling under ambient temperature conditions gives good results and is preferred, but an even slower rate of cooling, which can be obtained for example by passing the coated cellophane through a heated chamber, is advantageous in some instances. However, positive cooling means as above described can be employed to reduce the temperature of the coated article of the invention over a portion of the temperature range, so long as the cooling means is not applied until after the wax has firmly solidified, which is at least 2 minutes after application of the molten wax.

To illustrate the process and compositions of the present invention, a microcrystalline wax was prepared by distilling a slack wax from the dewaxing of lubricating oil to remove as distillate all materials boiling below 525° F. at 2 mm. of mercury pressure. The bottom fraction was dissolved in a mixture of about equal parts by volume of methyl ethyl ketone and benzene at a temperature of about 190° F. The resulting solution was slowly cooled to 50° F. and the wax precipitated at this temperature was separated by filtration. The separated wax was re-dissolved in an additional quantity of the same solvent at a temperature of about 190° F. and the resulting solution was slowly cooled to 115° F. The wax precipitated at this temperature was separated by filtering. The separated, deoiled wax was washed with an additional quantity of the same solvent at 115° F., and the solvent then was removed from the wax. The recovered wax had a melting point of 193° F., a penetration at 110° F. of 14 and a viscosity at 210° F. of 84. This microcrystalline wax can also be prepared by dissolving the residual fraction from the distillation of slack wax in a solvent as above described, cooling the solution to 115° F. and recovering the precipitated wax. However, to improve the operation of the filters, it has been found advantageous to perform the separation in two steps as above described. The so-formed microcrystalline wax was used to coat cellophane by conventional means.

Specifically, cellophane was continuously passed in contact with transfer rollers, i.e., rollers dipping into a bath of the molten wax, to transfer wax from the bath to the cellophane as a smooth, uniform coating. The coated cellophane was then contacted with an equalizer rod to regulate the wax load to 5.2 pounds of wax per ream of cellophane. The cellophane containing the superficial film of molten wax was maintained at ambient temperature in an atmosphere of air at a temperature of about 70° F. for 2 hours. The thickness of the article and the W.V.P. (water vapor permeability) were then measured;

the results obtained are given in the following table, the so-prepared microcrystalline wax being designated "Wax A."

Additional microcrystalline waxes were prepared in the manner above described, except that the temperature of precipitation was varied to vary the properties of the waxes. In the following table, "Wax B" had a melting point of 171° F., a penetration at 110° F. of 60, and a viscosity at 210° F. of 78 SUS. "Wax C" had a melting point of 178° F., a penetration at 110° F. of 29, and a viscosity at 210° F. of 71. For comparison, the table indicates values obtained when using plain cellophane and cellophane laminated with polyethylene. In each instance, the microcrystalline wax-coated cellophane was smooth, uniform and attractive in appearance.

| Wax Used For Coating | Wax Load, Lbs./Ream | Gauge, Mils | WVP¹ |
|---|---|---|---|
| Wax A | 5.2 | 1.3 | 2.5 |
| Wax B | 4.8 | | 6.7 |
|  | 6.2 | | 5.7 |
|  | 9.2 | | 4.4 |
| Wax C | 4.2 | | 2.9 |
|  | 6.0 | | 3.0 |
|  | 9.6 | | 2.3 |
| Cellophane (Plain) | | 0.9 | 195 |
| Cellophane-Polyethylene | | 1.7 | 30.5 |
| Cellophane-Polyethylene | | 3.6 | 10.3 |
| Cellophane-Polyethylene | | 4.5 | 6.6 |

¹ Water vapor permeability in grams/square meter/24 hours, determined by TAPPI T464 m-45.

To emphasize the importance of using high melting microcrystalline waxes, paraffin wax having a melting point of 153° F., a penetration at 110° F. of 20 and a viscosity at 210° F. of 44.2 SUS was prepared from a distillate petroleum wax fraction. Following the procedure above described, this wax was used to coat cellophane. The resulting coated article was streaked and grainy in appearance and was not suitable for commercial use.

In order to emphasize the importance of cooling slowly as above described, the microcrystalline wax designated "Wax A" above, was used to coat cellophane also as above described. However, instead of slow cooling, the cellophane coated with molten wax was submerged in a water bath at a temperature of about 70° F. thereby rapidly solidifying the wax to solid phase. The wax coating of the resulting article readily sloughed from the cellophane, and in fact the cellophane could not be flexed without causing a portion of the wax to fall off.

The invention claimed is:

1. A new article of manufacture exhibiting substantially improved resistance to water vapor permeation and comprising cellophane having a superficial coating consisting essentially of a petroleum microcrystalline wax having a melting point of from 188° to 198° F., a penetration at 110° F. of 100 maximum and a viscosity at 210° F. of from 60 to 90 SUS, said coating having been applied in molten phase and solidified by slowly cooling in the absence of positive cooling means to a temperature at least below the melting point.

2. Process for preparing wax coated cellophane having a substantially improved resistance to water vapor permeation which comprises applying in molten phase to cellophane, a superficial film consisting essentially of petroleum hydrocarbon microcrystalline wax having a melting point of from 188° F. to 198° F., a penetration at 110° F. of 100 maximum and a viscosity at 210° F. of from 60 to 90 SUS, and solidifying said superficial film by slowly cooling in the absence of positive cooling means to a temperature at least below the melting point.

References Cited in the file of this patent
UNITED STATES PATENTS

| | | |
|---|---|---|
| 2,042,588 | Charch et al. | June 2, 1936 |
| 2,337,939 | Sermattei | Dec. 28, 1943 |
| 2,348,687 | Abrams et al. | May 9, 1944 |
| 2,642,366 | Rumberger | June 16, 1953 |
| 2,699,999 | Mahler | Jan. 18, 1955 |
| 2,753,275 | Wiles et al. | July 3, 1956 |
| 2,768,906 | James | Oct. 30, 1956 |
| 2,773,812 | Tench | Dec. 11, 1956 |
| 2,833,671 | Funk et al. | May 6, 1958 |
| 2,858,236 | Asselin et al. | Oct. 28, 1958 |
| 2,892,735 | Curler et al. | June 30, 1959 |
| 2,944,918 | Nagel et al. | July 12, 1960 |